Aug. 26, 1930. W. L. HUTCHINSON 1,774,329
CAGE FOR CYLINDRICAL ROLLERS
Filed Sept. 25, 1929
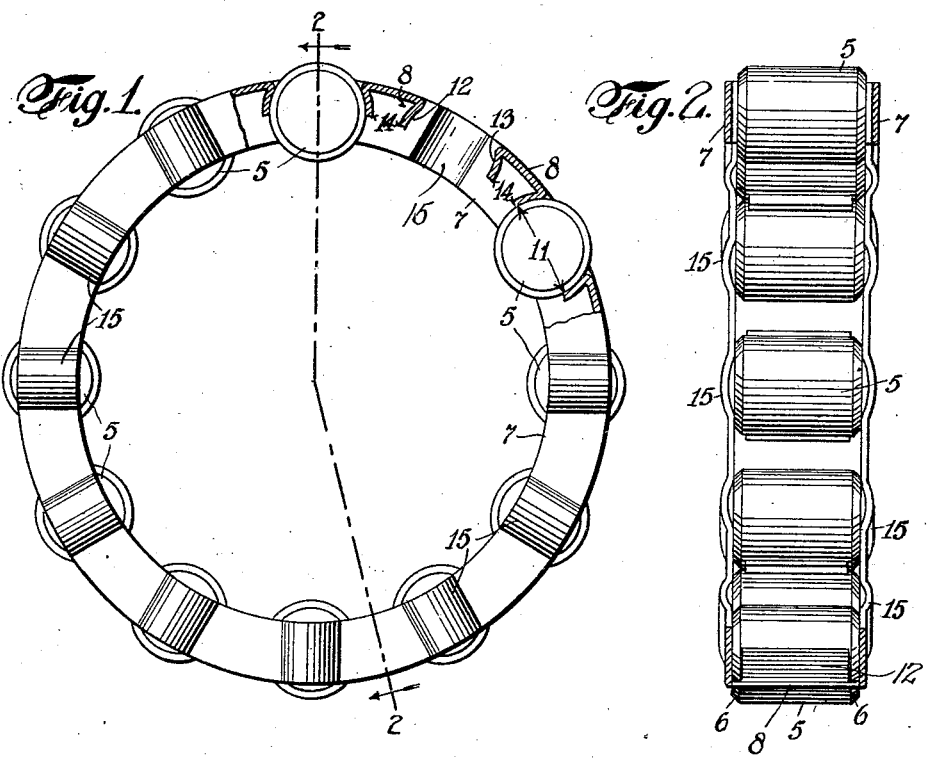
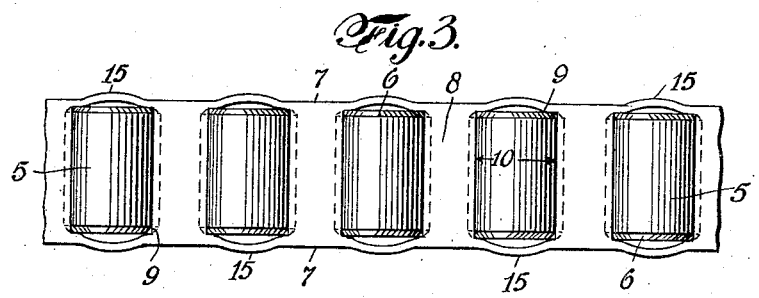
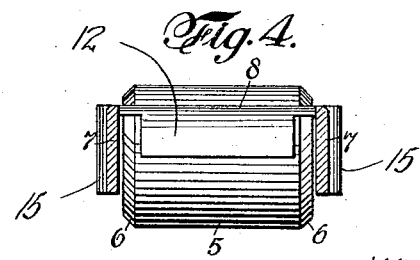
INVENTOR
WALTER L. HUTCHINSON
BY
ATTORNEY Patented Aug. 26, 1930

1,774,329

UNITED STATES PATENT OFFICE

WALTER L. HUTCHINSON, OF HARTFORD, CONNECTICUT, ASSIGNOR TO THE SKAYEF BALL BEARING COMPANY, OF HARTFORD, CONNECTICUT, A CORPORATION OF CONNECTICUT

CAGE FOR CYLINDRICAL ROLLERS

Application filed September 25, 1929. Serial No. 395,044.

The primary object of this invention is to provide a cage for cylindrical rollers of roller bearings in which the rollers may be readily assembled and disassembled, and to provide when assembled with its complement of rollers a self-contained handling unit.

Another object of the invention is to provide means whereby the rollers may be individually released or by the application of simple means all the rollers may be released at the same time.

In the drawings accompanying this specification one embodiment of the invention is illustrated which may be regarded as the preferred form since it is shown in accordance with the manner in which the cage has been designed for what I would assume to be its most general application, in which drawings—

Figure 1 is an end view partly in section, of a cage made in accordance with my invention, in which is assembled a full complement of rollers.

Fig. 2 is a section of Figure 1 at about the line 2—2.

Fig. 3 is a detail in which a portion of the cage is assumed to be spread out to more clearly demonstrate certain features of the invention, and Fig. 4 is an enlarged cross sectional detail.

According to the usual prevailing practice the cage will be made of sheet metal pressed and bent into shape, the entire cage being of a single uninterrupted piece. The cage is especially designed for supporting, separating and retaining cylindrical rollers such as 5, each of these rollers being practically cylindrical from end to end and having at each end a slight chamfer 6. Otherwise the end of the roller is substantially flat.

The cage is shown comprising two side ring members 7 joined by a central substantially cylindrical web 8 in which are formed openings for receiving the rollers. In the present illustration the rollers are inserted in the pockets 9 from outside the cage by an inward movement, the width 10 of the mouth of the pocket being shorter than the diameter 11 of the roller so that the roller cannot pass outwardly when properly seated.

In forming the pocket openings 9, side flaps 12 and 13 are struck inwardly and have their ends lying between the side member 7 and preferably with a slight clearance.

The flaps 12 and 13 are formed on their roller engaging faces with a substantially cylindrical contour conforming to the contour of the roll which is to be engaged. This particular cage was designed for use on cylindrical roller bearings, but it will be apparent that other forms or shapes of rollers may be used in the cage. In any event, the flaps 12 and 13 must conform to at least some portion of the perimeter of the roller, and preferably the distance apart 14 of their free ends is less than the roller diameter 11.

To enable an easy assembly and disassembly of the rollers, the rings 7 while being substantially flat between the roller pockets, are bowed outwardly as at 15 beyond the roller pocket 9 and beyond the position which will be occupied by the end of the roller. This springiness permits the rollers to be snapped in from the top or outside. To facilitate such snapping in, the bows 15 may be compressed either by the fingers of the operator or by some mechanical device. When it is desired to remove the roller the bows 15 will also be pressed in and the roller then readily removed. Or by applying pressure to all the bows 15 on both sides at the same time, all the pockets may be freed so that the rollers may be readily inserted or removed.

It will be apparent that changes may be made within the scope of the claims without departing from the spirit of my invention. Although the type of material which is used for the cage has not been especially mentioned, this may be made of steel or bronze of suitable consistency and elasticity.

Having described my invention, I claim and desire to secure by Letters Patent:

1. A retaining cage for roller bearings comprising a sheet metal member having a pair of side rings, these being united by a central web, and roller pockets being formed in such web, there being side flaps projecting inwardly from the web, the ends of the flaps being adapted to embrace the sides of the rollers and being spaced from the side rings, and the side rings opposite the ends of the pockets being bowed outwardly whereby upon the application of pressure to the bows the mouth of the pocket will open permitting the introduction and withdrawal of the roller.

2. A retaining cage for roller bearings comprising a sheet metal member having a pair of side rings, these being united by a central web, and roller pockets being formed in such web, there being side flaps struck inwardly from the web, the free ends of the flaps at each pocket being located at distance apart shorter than the diameter of the contemplated roller and adapted to embrace the sides of the roller, the sides of the flaps being spaced from the side rings, and the side rings opposite the ends of each of the pockets being bowed outwardly whereby upon the application of pressure to the bows the mouth of the pocket will open permitting the introduction and withdrawal of the roller.

3. A retaining cage for roller bearings comprising a sheet metal member having a pair of side rings, these being united by a central web, and roller pockets being formed in such web, there being side flaps struck inwardly from the web, the width of the pocket opening being less than the diameter of the contemplated roller, the free ends of the flaps at each pocket being located a distance apart shorter than the diameter of the contemplated roller and adapted to embrace the sides of the roller, the sides of the flaps being spaced from the side rings, and the side rings opposite the ends of each of the pockets being bowed outwardly whereby upon the application of pressure to the bows the mouth of the pocket will open permitting the introduction and withdrawal of the roller.

Signed at Hartford, Connecticut, this 17th day of September, 1929.

WALTER L. HUTCHINSON.